US012512681B2

(12) United States Patent
Mitsunaga et al.

(10) Patent No.: US 12,512,681 B2
(45) Date of Patent: Dec. 30, 2025

(54) POWER MANAGEMENT DEVICE AND POWER FEEDING SYSTEM

(71) Applicant: TDK CORPORATION, Tokyo (JP)

(72) Inventors: Takuma Mitsunaga, Tokyo (JP); Shingo Suzuki, Tokyo (JP); Masao Ichi, Tokyo (JP); Katsuo Naoi, Tokyo (JP); Hisakazu Uto, Tokyo (JP)

(73) Assignee: TDK CORPORATION, Tokyo (JP)

( * ) Notice: Subject to any disclaimer, the term of this patent is extended or adjusted under 35 U.S.C. 154(b) by 644 days.

(21) Appl. No.: 17/919,586

(22) PCT Filed: Feb. 15, 2021

(86) PCT No.: PCT/JP2021/005547
§ 371 (c)(1),
(2) Date: Oct. 18, 2022

(87) PCT Pub. No.: WO2022/172457
PCT Pub. Date: Aug. 18, 2022

(65) Prior Publication Data
US 2023/0344244 A1    Oct. 26, 2023

(51) Int. Cl.
*H01M 10/46* (2006.01)
*H01M 10/42* (2006.01)
*H02J 7/00* (2006.01)

(52) U.S. Cl.
CPC ......... *H02J 7/0014* (2013.01); *H01M 10/425* (2013.01); *H01M 10/46* (2013.01); *H02J 7/0049* (2020.01); *H01M 2010/4271* (2013.01); *H02J 2207/20* (2020.01)

(58) Field of Classification Search
CPC .... H02J 7/0014; H02J 7/0049; H02J 2207/20; H02J 7/00; H01M 10/425; H01M 10/46; H01M 2010/4271; H01M 10/44; Y02E 60/10
USPC ........................................................ 320/134
See application file for complete search history.

(56) References Cited

U.S. PATENT DOCUMENTS

2016/0276715 A1\*  9/2016  Kajitani ................ H02J 7/0016

FOREIGN PATENT DOCUMENTS

| JP | 2013005459 A | \* | 1/2013 | |
|---|---|---|---|---|
| JP | 2013223314 A | \* | 10/2013 | |
| WO | 2012/057032 A1 | | 5/2012 | |
| WO | WO-2019145997 A1 | \* | 8/2019 | ............ H02J 7/0018 |

\* cited by examiner

*Primary Examiner* — Julian D Huffman
*Assistant Examiner* — Aiman Bickiya
(74) *Attorney, Agent, or Firm* — Oliff PLC

(57) ABSTRACT

A power management device includes: a first determination unit that determines whether or not an execution condition for executing cell balancing for equalizing states of charge of a plurality of battery cells included in a storage battery connected to a direct current (DC) bus via a converter is satisfied; and a control unit that performs cell balancing execution control for causing a battery management device managing the storage battery to execute the cell balancing when the execution condition is satisfied. The control unit changes a target voltage of the converter so that a state of charge of the storage battery becomes a state in which the battery management device starts the cell balancing in the cell balancing execution control.

12 Claims, 6 Drawing Sheets

POWER MANAGEMENT DEVICE AND POWER FEEDING SYSTEM

TECHNICAL FIELD

The present disclosure relates to a power management device and a power feeding system.

BACKGROUND ART

In recent years, electric power generation facilities using renewable energy such as wind power and solar power have been introduced. In particular, there is a strong need for power feeding systems that can contribute to the realization of a low-carbon society while improving economic efficiency in areas where power system infrastructure is not well established, such as isolated areas and depopulated areas. Even in areas where power system infrastructure is already in place, expectations are increasing for power feeding systems that stably and continuously supply electric power to a load device when the power system is shut down due to natural disasters or the like.

For example, Patent Literature 1 describes a power feeding system including a photovoltaic power generation device and a rechargeable storage battery. In this power feeding system, electric power is supplied from the photovoltaic power generation device to a load device, and the storage battery is charged and discharged according to the difference between the amount of electric power generated by the photovoltaic power generation device and the load power.

CITATION LIST

Patent Literature

Patent Literature 1: WO 2012/057032 A

SUMMARY OF INVENTION

Technical Problem

In the power feeding system described in Patent Literature a plurality of battery cells are used as the storage battery, As the storage battery is used, the state of charge (amount of stored electric power) varies among the battery cells. As a result, the effective storage capacity of the storage battery may decrease. In general, a battery management unit (BMU) has a function (cell balancing function) for reducing variation in the state of charge in a charging end period or discharging end period. However, in the above-described power feeding system, the storage battery is used in a range that the storage battery is not in a charging end period or a discharging end period in consideration of security. Therefore, there is a possibility that variation in the state of charge among the battery cells is not reduced.

The present disclosure describes a power management device and a power feeding system capable of suppressing a decrease in an effective storage capacity of a storage battery.

Solution to Problem

A power management device according to one aspect of the present disclosure includes: a first determination unit that determines whether or not an execution condition for executing cell balancing for equalizing states of charge of a plurality of battery cells included in a storage battery connected to a direct current (DC) bus via a converter is satisfied; and a control unit that performs cell balancing execution control for causing a battery management device managing the storage battery to execute the cell balancing when the execution condition is satisfied. The control unit changes a target voltage of the converter so that a state of charge of the storage battery becomes a state in which the battery management device starts the cell balancing in the cell balancing execution control.

In the power management device, the target voltage of the converter is changed so that the state of charge of the storage battery becomes a state in which the battery management device starts the cell balancing when the execution condition for executing the cell balancing is satisfied. The storage battery connected to the converter is likely to be charged. or discharged by changing the target voltage of the converter, Therefore, the cell balancing can be executed even if the storage battery is used in a range in which the storage battery is not in a charging end period or in a discharging end period during normal operation, As a result, it is possible to suppress a decrease in the effective storage capacity of the storage battery.

The control unit may lower a maximum current value of an electric current between the converter and the storage battery in the cell balancing execution control. The cell balancing is executed when the state of charge of the storage battery is a charging end period or a discharging end period. If the storage battery in the charging end period is rapidly charged, the storage battery may be overcharged. Therefore, by lowering the maximum current value, the charging speed can be reduced, and the possibility that the storage battery is overcharged can be reduced. Similarly, if the storage battery in the discharge end period is rapidly discharged, the storage battery may be over-discharged. Therefore, by lowering the maximum current value, the discharging speed can be reduced and the possibility that the storage battery is over-discharged can be reduced.

The control unit may stop power supply of a power generation device that supplies electric power to the DC bus in the cell balancing execution control. When the maximum current value of the electric current between the converter and the storage battery is lowered, the amount of electric power that can be charged to the storage battery via the converter decreases. Therefore, the electric power balance can be maintained by stopping the power supply of the power generation device.

The control unit may cause an auxiliary power supply device that supplies electric power to the DC bus to supply electric power in the cell balancing execution control. The electric power that can be supplied from the storage battery may decrease due to executing the cell balancing. Therefore, by causing the auxiliary power supply device to supply electric power, it is possible to compensate for the decrease in the electric power supplied from the storage battery.

The power management device may further include a second determination unit that determines whether or not the state of charge of the storage battery becomes a predetermined state. The control unit may perform the cell balancing execution control when the execution condition is satisfied and the state of charge becomes the predetermined state. At the time when the execution condition is satisfied, the state of charge of the storage battery is not necessarily a fully charged state or a fully discharged state. According to the above-described. configuration, for example, the cell balancing execution control is performed in response to the state of charge of the storage battery becoming a fully charged state or a fully discharged state. Therefore, since the power feeding system including the storage battery can be normally operated as much as possible, the stability of the power feeding system can be improved.

The second determination unit may determine whether or not the state of charge of the storage battery becomes a fully charged state. The control unit may lower the target voltage in the cell balancing execution control. The battery management device may execute the cell balancing when the storage battery reaches a charging end period. In this case, by lowering the target voltage of the converter, the storage battery is further charged from the fully charged state. As a result, the state of charge of the storage battery can be set to a state of charge in which the battery management device starts the cell balancing, so that a decrease in the effective storage capacity of the storage battery can be suppressed.

The second determination unit may determine whether or not the state of charge of the storage battery becomes a fully discharged state. The control unit may raise the target voltage in the cell balancing execution control. The battery management device may execute the cell balancing when the storage battery reaches a discharging end period. In this case, by raising the target voltage of the converter, the storage battery is further discharged from the fully discharged state. As a result, the state of charge of the storage battery can be set to a state of charge in which the battery management device starts the cell balancing, so that a decrease in the effective storage capacity of the storage battery can be suppressed.

The first determination unit may determine whether or not the execution condition is satisfied based on a maximum cell voltage and a minimum cell voltage among cell voltages of the plurality of battery cells. It is considered that the greater the difference between the maximum cell voltage and the minimum cell voltage is, the greater the variation in the state of charge among the plurality of battery cells is. Therefore, by considering the maximum cell voltage and the minimum cell voltage, it is possible to improve the accuracy of determining whether or not the cell balancing should be executed.

The first determination unit may determine that the execution condition is satisfied when a rate obtained by dividing a difference between the maximum cell voltage and the minimum cell voltage by a theoretical value of the cell voltage is greater than a rate threshold value set in advance. The magnitude of the difference between the maximum cell voltage and the minimum cell voltage, which can be determined as the occurrence of the variation in the state of charge among the plurality of battery cells, varies depending on the theoretical value of the cell voltage. For example, as the theoretical value of the cell voltage is larger, the magnitude of the difference that can be determined as the occurrence of the variation becomes larger. Therefore, by using the rate obtained by dividing the difference between the maximum cell voltage and the minimum cell voltage by the theoretical value of the cell voltage, it is possible to further improve the accuracy of determining whether or not the cell balancing should be executed.

The rate threshold value may be 0.3% or more, and may be 2.0% or less. When the rate threshold value is 2.0% or less, the possibility that the function of the battery cell is impaired can be reduced, For example, in a configuration in which a renewable energy power generation device supplies electric power to the DC bus, when the rate threshold value is 0.3% or more, the renewable energy can be effectively utilized. As a result, the cell balancing can be executed while effectively utilizing the renewable energy without impairing the function of any of the battery cells. This makes it possible to further suppress a decrease in the effective storage capacity of the storage battery.

The first determination unit may determine whether or not the execution condition is satisfied based on a total of power consumption per day consumed by load devices that receive electric power from the DC bus and a total of supply power per day supplied to the DC bus by an auxiliary power supply device that supplies electric power to the DC bus. When the electric power that can be supplied from the storage battery is less than the power consumption, electric power is supplied from the auxiliary power supply device. Therefore, a value obtained by subtracting the total of supply power per day supplied by the auxiliary power supply device from the total of power consumption per day consumed by the load devices can be estimated as the effective storage capacity of the storage battery. It is considered that the smaller the effective storage capacity is, the greater the variation in the state of charge among the plurality of battery cells is. Therefore, by considering the total of power consumption per day consumed by the load devices and the total of supply power per day supplied by the auxiliary power supply device, it is possible to improve the accuracy of determining whether or not the cell balancing should be executed.

The first determination unit may determine that the execution condition is satisfied when a storage capacity rate obtained by dividing a moving average value of a value obtained by subtracting the total of the supply power from the total of the power consumption by a theoretical value of the storage capacity of the storage battery is less than a capacity rate threshold value set in advance. Since the power consumption and the like can vary from day to day, the influence of the variation can be reduced by using the moving average value of the value obtained by subtracting the total of supply power per day supplied by the auxiliary power supply device from the total of power consumption per day consumed by the load devices. Further, the size of the effective storage capacity which can be determined as the occurrence of the variation in the state of charge among the plurality of battery cells varies depending on the theoretical value of the storage capacity of the storage battery. For example, as the theoretical value of the storage capacity is larger, the size of the effective storage capacity that can be determined as the occurrence of the variation becomes larger. Therefore, by using the storage capacity rate, it is possible to further improve the accuracy of determining whether or not the cell balancing should be executed.

The capacity rate threshold value may be 65% or more, and may be 90% or less. When the capacity rate threshold value is 65% or more, the possibility that the function of the battery cell is impaired can be reduced. For example, in a configuration in which a renewable energy power generation device supplies electric power to the DC bus, when the capacity rate threshold value is 90% or less, the renewable energy can be effectively utilized. As a result, the cell balancing can be executed while effectively utilizing the renewable energy without impairing the function of any of the battery cells. This makes it possible to further suppress a decrease in the effective storage capacity of the storage battery.

A power feeding system according to another aspect of the present disclosure includes: a DC bus for supplying DC electric power; a power supply device that includes a power generation device and supplies electric power to the DC bus; an auxiliary power supply device that supplies electric power to the DC bus; a first converter that is connected to the DC bus and converts a bus voltage supplied to the DC bus into a load voltage supplied to a load device; a storage battery that includes a plurality of battery cells; a battery management device that manages the storage battery; a second converter that is provided between the storage battery and the DC bus and that is capable of bidirectionally converting between the bus voltage and a battery voltage of the storage battery; and a power management device that controls the second converter to charge and discharge the storage battery. The power management device determines whether or not an execution condition for executing cell balancing for equalizing states of charge of the plurality of battery cells is satisfied. The power management device changes a target voltage of the second converter so that a state of charge of the storage battery becomes a state in which the battery management device starts the cell balancing when the execution condition is satisfied.

In the power feeding system, the target voltage of the second converter is changed so that the state of charge of the storage battery becomes a state in which the battery management device starts the cell balancing when the execution condition for executing the cell balancing is satisfied. The storage battery connected to the second converter is likely to be charged or discharged by changing the target voltage of the second converter. Therefore, the cell balancing can be executed even if the storage battery is used in a range in which the storage battery is not in a charging end period or in a discharging end period during normal operation. As a result, it is possible to suppress a decrease in the effective storage capacity of the storage battery.

Advantageous Effects Of Invention

According to each aspect and each embodiment of the present disclosure, a decrease in an effective storage capacity of a storage battery can be suppressed.

DESCRIPTION OF EMBODIMENTS

In the following, some embodiments of the present disclosure will be described with reference to the drawings. It should be noted that in the description of the drawings, the same components are designated with the same reference signs, and the redundant description is omitted.

Figure 1:
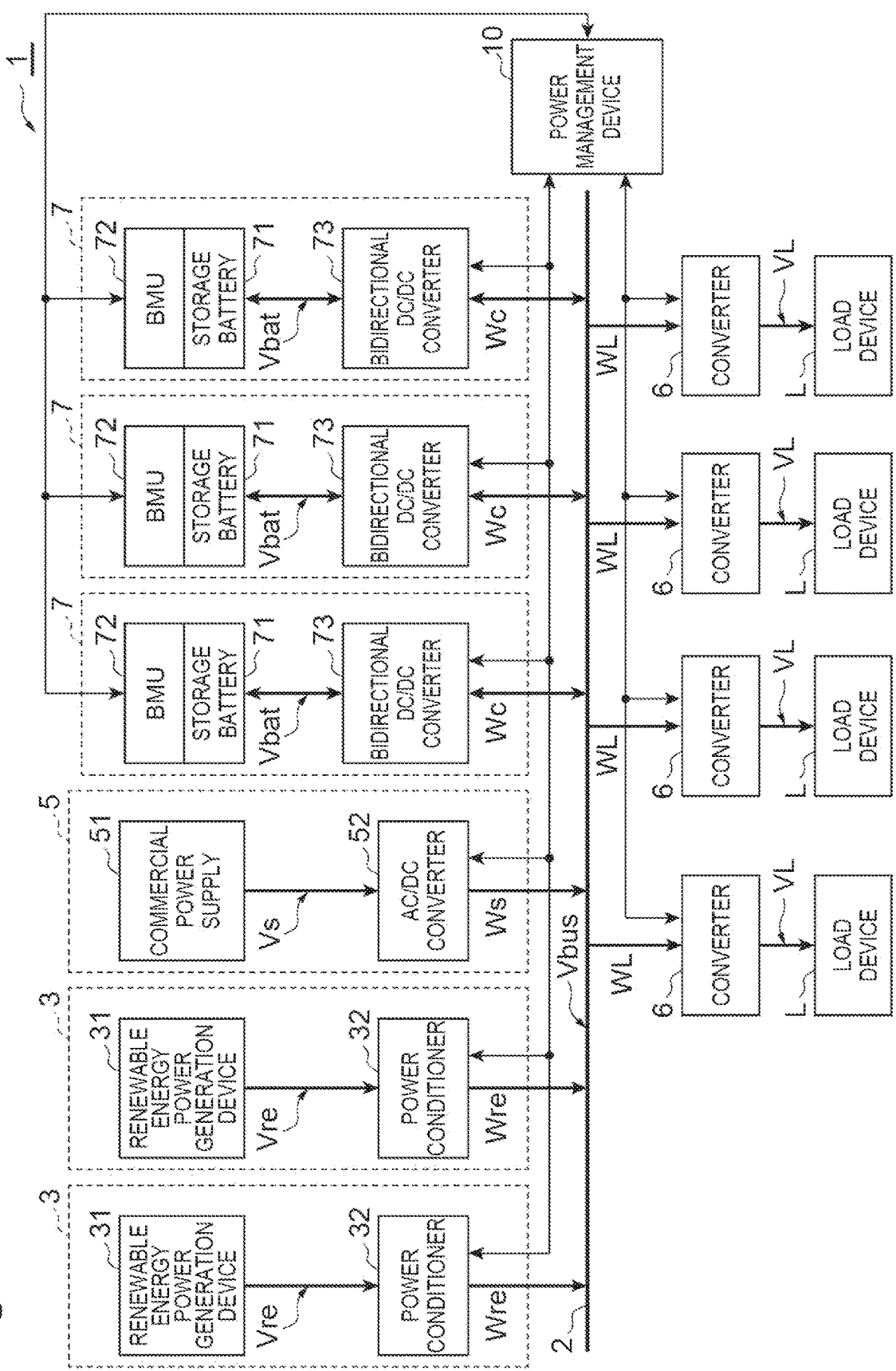
FIG. 1 is a configuration diagram schematically showing a power feeding system including a power management device according to an embodiment.

A power feeding system including a power management device according to an embodiment will be described with reference to FIG. 1. FIG. 1 is a configuration diagram schematically showing a power feeding system including a power management device according to an embodiment. A power feeding system 1 shown in FIG. 1 is a system that supplies load power WL (load voltage VL) to load devices L. In the present embodiment, the power feeding system 1 is a direct current (DC) power feeding system.

The load device L may be a DC load device that operates with a DC voltage or an alternating current (AC) load device that operates with an AC voltage. Examples of the DC load devices include a light emission diode (LED) illuminators, DC fans, and personal computers. Examples of AC load devices include washing machines, refrigerators, and air conditioners. The power feeding system 1 includes a DC bus 2, power supply devices 3, an auxiliary power supply device 5, converters 6 (first converters), power storage devices 7, and a power management device 10.

The DC bus 2 is a bus that functions as a bus line for performing DC power supply for supplying DC electric power. The DC bus 2 is laid across the installation locations of the power supply devices 3, the auxiliary power supply device 5, the power storage devices 7, and the load devices L. A bus voltage Vbus is supplied to the DC bus 2. The bus voltage Vbus is a high DC voltage. The bus voltage Vbus is set to be included in the range of the input voltage of the converter 6. The bus voltage Vbus is, for example, a voltage equal to or higher than DC 250 V and equal to or lower than DC 450 V. The voltage value of the bus voltage Vbus may be fixed or may vary.

The power supply device 3 is a device that supplies electric power to the DC bus 2. In the present embodiment, the power feeding system 1 includes two power supply devices 3. The number of power supply devices 3 is not limited to two, and may be appropriately, changed as necessary. The power supply device 3 includes a renewable energy power generation device 31 (power generation device) and a power conditioner 32.

The renewable energy power generation device 31 is a device that generates generated power Wre. Examples of the renewable energy power generation device 31 include a photovoltaic power generation device, a wind power generation device, a hydroelectric power generation device, and a geothermal power generation device. The renewable energy power generation device 31 is connected to the DC bus 2 via the power conditioner 32. The renewable energy power generation device 31 generates a power generation voltage Vre having a predetermined voltage value, and outputs the generated power Wre corresponding to the power generation voltage Vre. The power generation voltage Vre may be a DC voltage or an AC voltage. Although the voltage values of the power generation voltage Vre generated by the two renewable energy power generation devices 31 may be different from each other and the magnitudes of the generated power Wre generated by the two renewable energy power generation devices 31 may be different from each other, the same reference numerals are used for convenience of description.

The power conditioner 32 is connected to the DC bus 2, and is a device that converts the power generation voltage Vre into the bus voltage Vbus. When the power generation voltage Vre is a DC voltage, the power conditioner 32 includes a DC/DC converter. When the power generation voltage Vre is an AC voltage, the power conditioner 32 includes an AC/DC converter. The power conditioner 32 operates with, for example, a DC voltage internally generated based on the power generation voltage Vre. The power conditioner 32 controls the generated power Wre by controlling the power generation operation of the renewable energy power generation device 31 based on a command from the power management device 10.

When the power conditioner 32 receives a start command from the power management device 10, the power conditioner 32 converts the power generation voltage Vre into the bus voltage Vbus and supplies the bus voltage Vbus to the DC bus 2, thereby supplying the generated power Wre to the DC bus 2. When the power conditioner 32 receives a stop command from the power management device 10, the power conditioner 32 stops supplying the generated power Wre. The power conditioner 32 has a power measurement function of measuring the generated power Wre supplied from the renewable energy power generation device 31 to the DC bus 2. The power conditioner 32 periodically measures the generated power Wre, for example. The power conditioner 32 transmits the measured value of the generated power Wre to the power management device 10.

The auxiliary power supply device 5 is a device that supplies electric power to the DC bus 2. The auxiliary power supply device 5 includes a commercial power supply 51 and an AC/DC converter 52. The commercial power supply 51 supplies system power Ws including a system voltage Vs of a predetermined voltage value. The system voltage Vs is an AC voltage. The commercial power supply 51 is connected to the DC bus 2 via the AC/DC converter 52.

The AC/DC converter 52 is connected to the DC bus 2, and is a device that converts the system voltage Vs into the bus voltage Vbus. The AC/DC converter 52 operates with, for example, a DC voltage internally generated based on the system voltage Vs. When the AC/DC converter 52 receives a start command from the power management device 10, the AC/DC converter 52 converts the system voltage Vs into the bus voltage Vbus and supplies the bus voltage Vbus to the DC bus 2, thereby supplying the system power Ws to the DC bus 2. When the AC/DC converter 52 receives a stop command from the power management device 10, the AC/DC converter 52 stops supplying the system power Ws. The AC/DC converter 52 has a power measurement function of measuring the system power Ws supplied from the commercial power supply 51 to the DC bus 2. The AC/DC converter 52 periodically measures the system power Ws, for example. The AC/DC converter 52 transmits the measured value of the system power Ws to the power management device 10.

Since the auxiliary power supply device 5 can stably supply electric power, the auxiliary power supply device 5 is controlled so as to supply electric power when the electric power of the entire power feeding system 1 is insufficient. In order to maintain the power feeding system 1, the system power Ws is equal to or greater than the sum of the total load power WL and the standby power in the power feeding system 1. The standby power includes power consumption of the power management device 10 and power consumption of auxiliary devices (relays, fans, and small-capacity power supplies, not shown).

The converter 6 is connected to the DC bus 2, and is a device that converts the bus voltage Vbus into a load voltage VL. The load voltage VL is a voltage supplied to the load device L. The load device L is connected to the DC bus 2 via the converter 6. The converter 6 operates with, for example, a DC voltage internally generated based on the bus voltage Vbus. In the present embodiment, the power feeding system 1 includes four converters 6. The number of converters 6 is not limited to four, and may be changed in accordance with the number of load devices L.

When receiving a start command from the power management device 10, the converter 6 converts the bus voltage Vbus into the load voltage VL, and supplies the load voltage VL (load power WL) to the load device L. When the load device L is a DC load device, the load voltage VL is a DC voltage, and the converter 6 is a DC/DC converter. When the load device L is an AC load device, the load voltage VL is an AC voltage, and the converter 6 is a DC/AC converter, When receiving a stop command from the power management device 10, the converter 6 stops supplying the load voltage VL.

The converter 6 has a current limiting function of limiting a load current supplied from the DC bus 2 to the load device L to an upper limit current value. The upper limit current value is set by the power management device 10. The converter 6 has a power measurement function of measuring the load power WL supplied from the DC bus 2 to the load device L based on the load voltage VL and the load current. The converter 6 periodically measures the load power WL, for example. The converter 6 transmits the measured value of the load power WL to the power management device 10.

The power storage device 7 is a device for storing surplus electric power occurring in the power feeding system 1 and supplying deficient electric power occurring in the power feeding system 1. When the difference power obtained by subtracting the sum of the load power WL from the sum of the supply power is greater than 0, surplus electric power equal to the magnitude (power value) of the difference power occurs. The supply power is electric power supplied to the DC bus 2. In the present embodiment, the supply power is the generated power Wre, and the system power Ws. To each power storage device 7, for example, power We obtained by equally dividing surplus electric power by the number of power storage devices 7 is supplied from the DC bus 2. When the difference power is less than 0, deficient electric power equal to the magnitude of the difference power occurs. From each power storage device 7, for example, power We obtained by equally dividing the deficient electric power by the number of power storage devices 7 is released to the DC bus 2.

The number of power storage devices 7 is not limited to three, and may be appropriately changed as necessary. Each of the power storage devices 7 includes a storage battery 71, a battery management unit (BMU) 72, and a bidirectional DC/DC converter 73 (second converter).

The storage battery 71 is a chargeable and dischargeable device. The storage battery 71 is connected to the DC bus 2 via the bidirectional DC/DC converter 73. Examples of the storage battery 71 include a lithium ion battery, a sodium-sulfur (NAS) battery, a redox flow battery, a lead acid battery, and a nickel metal hydride battery. In the present embodiment, the storage batteries 71 included in the power storage devices 7 are of the same type and have the same storage capacity (charge capacity). The storage capacity is the maximum amount of electric power that can be stored (charged). The storage batteries 71 included in the power storage devices 7 may be different types of storage batteries and may have different storage capacities. The storage battery 71 is a battery module including a plurality of battery cells. A plurality of battery cells included in one storage battery 71 are of the same type and have the same storage capacity.

The BMU 72 is a device for managing the storage battery 71. The BMU 72 has a function of measuring the battery voltage Vbat of the storage battery 71, a function of measuring the cell voltages Vcell of the battery cells constituting the storage battery 71, and a function of calculating the state of charge (SOC) by measuring the current values of the charging current and the discharging current of the storage battery 71. The battery voltage Vbat is a voltage of the storage battery 71. The cell voltage Vcell is a voltage of a battery cell.

The BMU 72 transmits battery information of the storage battery 71 to the power management device 10. The battery information includes a measured value of battery voltage Vbat, a measured value of cell voltage Well of each battery cell, a current value of each of the charging current and the discharging current, and SOC. The battery information may include only a measured value of the maximum cell voltage Vcellmax and a measured value of the minimum cell voltage Vcellmin in place of the measured values of all cell voltages Vcell. The maximum cell voltage Vcellmax is the largest cell voltage among the cell voltages Vcell of the plurality of battery cells. The minimum cell voltage Vcellmin is the smallest cell voltage among the cell voltages Vcell of the plurality of battery cells. The BMU 72 periodically transmits the battery information to the power management device 10.

The BMU 72 has a cell balancing function of equalizing cell voltages (state of charge) of a plurality of battery cells included in the storage battery 71. The BMU 72 includes a BMU 72 for operating the cell balancing function in the charging end period of the storage battery 71, and a BMU 72 for operating the cell balancing function in the discharging end period of the storage battery 71. For example, when the BMU 72 receives a cell balancing enable signal from the power management device 10, the BMU 72 enables the cell balancing function. The BMU 72 executes cell balancing of the storage battery 71 while continuing to charge and discharge the storage battery 71. That is, during the cell balancing, the storage battery 71 (storage device 7) is charged and discharged via the bidirectional DC/DC converter 73 without being disconnected from the power feeding system 1.

The bidirectional DC/DC converter 73 is connected to the DC bus 2, and is a device capable of bidirectionally converting between the bus voltage Vbus and the battery voltage Vbat. The bidirectional DC/DC converter 73 is provided between the storage battery 71 and the DC bus 2. As the bidirectional DC/DC converter 73, a known bidirectional DC/DC converter can be used. The bidirectional DC/DC converter 73 operates with, for example, a DC voltage internally generated based on the bus voltage Vbus.

The bidirectional DC/DC converter 73 is controlled by the power management device 10. Specifically, when the bidirectional DC/DC converter 73 receives a charge command from the power management device 10, the bidirectional DC/DC converter 73 converts the bus voltage Vbus into the battery voltage Vbat and causes a charging current to flow from the DC bus 2 to the storage battery 71. Thus, the storage battery 71 is charged. When the bidirectional DC/DC converter 73 receives a discharge command from the power management device 10, the bidirectional DC/DC converter 73 converts the battery voltage Vbat into the bus voltage Vbus and causes a discharging current to flow from the storage battery 71 to the DC bus 2. Thus, the storage battery 71 is discharged. The bidirectional DC/DC converter 73 may charge or discharge the storage battery 71 in a constant-current manner or in a constant-voltage manner.

When the bidirectional DC/DC converter 73 receives a stop command from the power management device 10, the bidirectional DC/DC converter 73 stops the operation and shifts to a sleep state in which the electric power consumption is reduced. When the bidirectional DC/DC converter 73 receives the charge command or the discharge command in the sleep state, the bidirectional DC/DC converter 73 exits from the sleep state and executes the charge process or the discharge process. The bidirectional DC/DC converter 73 has a current limiting function of limiting each current value of the charging current supplied to the storage battery 71 and the discharging current discharged from the storage battery 71 to a maximum current value or less. When the bidirectional DC/DC converter 73 receives a setting command of a maximum current value from the power management device 10, the bidirectional DC/DC converter 73 sets the maximum current value specified by the setting command. Upon receiving a setting command of a target voltage from the power management device 10, the bidirectional DC/DC converter 73 sets the target voltage to the target voltage specified by the setting command. The target voltage (value) is a voltage (value) for making the voltage value of the bus voltage Vbus constant. The bidirectional DC/DC converter 73 has a function of maintaining the voltage value of the bus voltage Vbus at the target voltage (value) even when the power Wc is changed.

The bidirectional DC/DC converter 73 has a power measurement function of measuring the power Wc. The bidirectional DC/DC converter 73 periodically measures the power Wc, for example. The bidirectional DC/DC converter 73 transmits the measured value of the power Wc to the power management device 10.

The power management device 10 is a device (controller) that manages the entire power feeding system 1. The power management device 10 is also referred to as an energy management system (EMS). The power management device 10 is communicably connected to the power supply devices 3, the auxiliary power supply device 5, the converters 6, and the power storage devices 7 via a communication line. The communication line may be configured to be wired or wireless. The power management device 10 may perform communication conforming to standards such as RS-232C, RS-485, Controller Area Network (CAN), and Ethernet (registered trademark).

The power management device 10 performs a voltage measurement process of measuring the bus voltage Vbus. The power management device 10 may directly measure the bus voltage Vbus. The power management device 10 may indirectly measure the bus voltage Vbus by the bidirectional DC/DC converter 73 measuring the bus voltage Vbus and transmitting the measured value to the power management device 10.

The power management device 10 transmits a start command and a stop command to each of the power conditioners 32, the AC/DC converter 52, the converters 6, and the bidirectional DC/DC converters 73. For example, the power management device 10 causes the converter 6 to supply the load voltage VL by transmitting a start command to the converter 6. The power management device 10 causes the converter 6 to stop supplying the load voltage VL by transmitting a stop command to the converter 6. The same applies to the other converters.

The power management device 10 performs a charge and discharge process of charging and discharging the storage battery 71 by controlling the bidirectional DC/DC converter 73. The power management device 10 performs the charge and discharge process depending on the difference power. When the sum of the supply power is greater than the sum of the load power WL (when the difference power is greater than 0), the power management device 10 transmits the charge command to the bidirectional DC/DC converter 73 and causes the storage battery 71 to store surplus electric power that is the difference power. In each storage battery 71, for example, electric power obtained by equally dividing the surplus electric power by the number of storage batteries 71 is stored. When the sum of the supply power is less than the sum of the load power WL (when the difference power is less than 0), the power management device 10 transmits the discharge command to the bidirectional DC/DC converter 73 and causes the storage battery 71 to discharge the deficient electric power. For example, electric power obtained by equally dividing the deficient electric power by the number of storage batteries 71 is discharged from each storage battery 71.

The power management device 10 performs a cell voltage equalization process (cell voltage equalization method) for equalizing cell voltages of battery cells included in the storage battery 71. For example, when the power feeding system 1 is started up, the power management device 10 transmits a cell balancing enable signal to each BMU 72 in order to enable the cell balancing function of the BMU 72. When the BMU 72 in which the cell balancing function is always enabled is used, the power management device 10 need not transmit the cell balancing enable signal. In the cell voltage equalization process, the power management device 10 determines whether or not the execution condition is satisfied, and performs cell balancing execution control fix causing the BMU 72 to execute cell balancing when the execution condition is satisfied. The execution condition is a condition for executing the cell balancing of a plurality of battery cells included in the storage battery 71. The cell voltage equalization process will be described in detail later.

Figure 2:
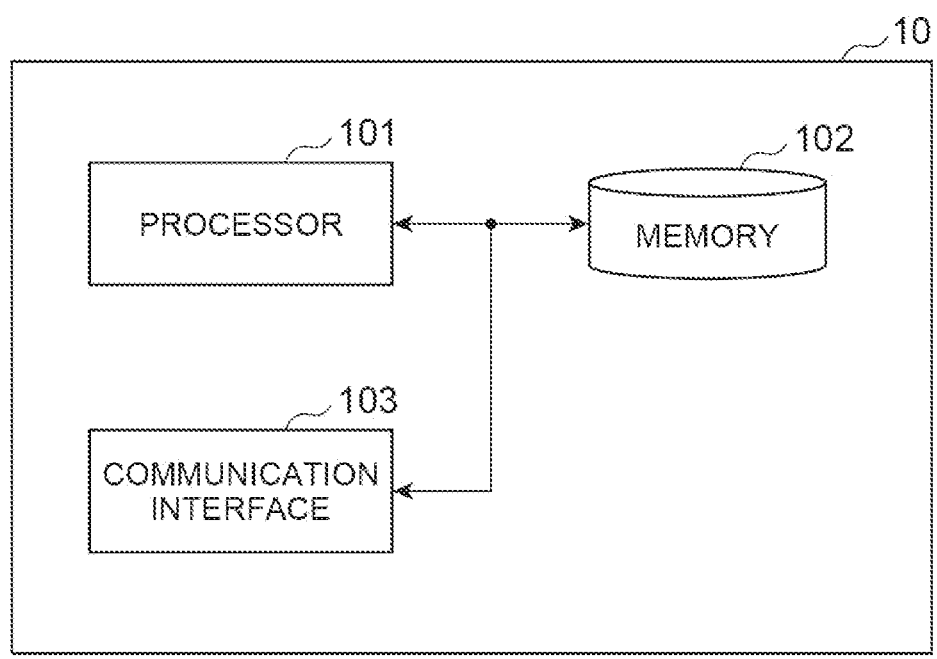
FIG. 2 is a hardware configuration diagram of the power management device shown in FIG. 1.

FIG. 2 is a hardware configuration diagram of the power management device shown in FIG. 1. As shown in FIG. 2, the power management device 10 may be physically configured as a computer including hardware such as a processor 101, a memory 102, and a communication interface 103. An example of the processor 101 is a central processing unit (CPU). The number of processors 101 may be one or more. The memory 102 may include a main storage device and an auxiliary storage device. The main storage device is constituted by a random access memory (RAM), a read only memory (ROM), and the like. Examples of the auxiliary storage device include a semiconductor memory and a hard disk device. The communication interface 103 is a device that transmits/receives data to/from other devices. The communication interface 103 includes, for example, a communication module, a network interface card (NIC), or a wireless communication module conforming to a communication standard such as RS-232C, RS-485, or CAN.

By the processor 101 reading a program stored in the memory 102 to execute the program, each hardware operates under the control of the processor 101 to read and write data from/to the memory 102. Thus, the functional units of the power management device 10 shown in FIG. 3 are implemented.

Figure 3:
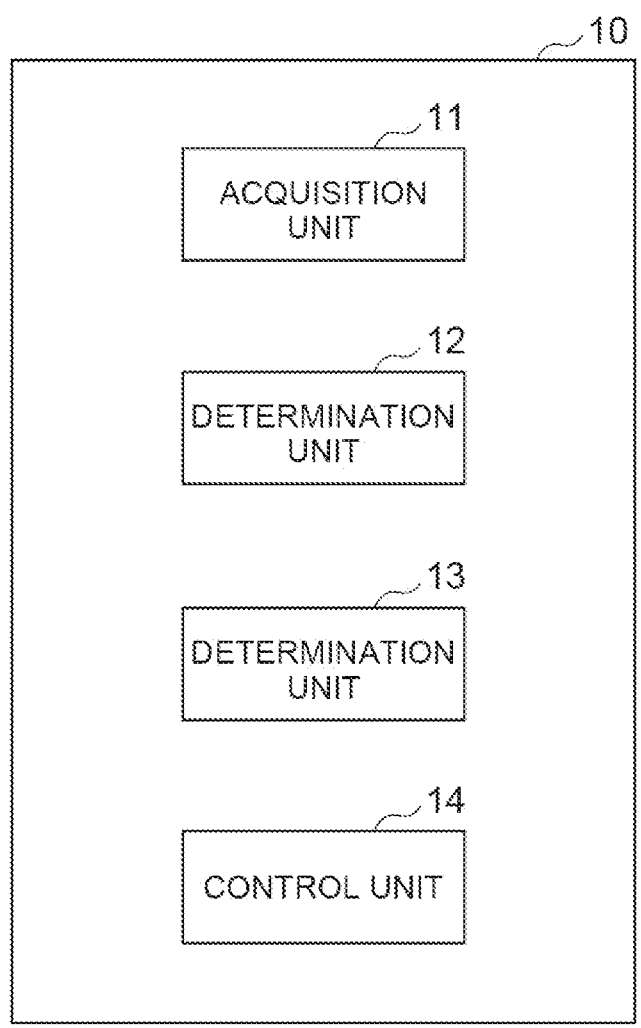
FIG. 3 is a functional block diagram of the power management device shown in FIG. 1.

FIG. 3 is a functional block diagram of the power management device shown in FIG. 1. As shown in FIG. 3, the power management device 10 functionally includes an acquisition unit 11, a determination unit 12 (first determination unit), a determination unit 13 (second determination unit), and a control unit 14. Since the function (operation) of each functional unit will be described in detail in the description of the cell voltage equalization method described later, the function of each functional unit will be briefly described here.

The acquisition unit 11 is a functional unit that acquires (receives) information necessary for the cell voltage equalization method. The acquisition unit 11 acquires battery information of each storage battery 71 and a measured value of each electric power. The acquisition unit 11 acquires the battery information of the storage battery 71 managed by the BMU 72 from each BMU 72. For example, the acquisition unit 11 acquires a measured value of the system power Ws from the AC/DC converter 52, and acquires a measured value of the load power WL from the converter 6.

The determination unit 12 is a functional unit that determines whether or not the execution condition is satisfied. The determination unit 12 determines whether or not the execution condition is satisfied based on, for example, the maximum cell voltage Vcellmax and the minimum cell voltage Vcellmin among the cell voltages Vcell of the plurality of battery cells included in the storage battery 71. The determination unit 12 may determine whether or not the execution condition is satisfied based on the total of the power consumption (load power WL) per day consumed by the load devices L and the total of the system power Ws per day supplied from the auxiliary power supply device 5 to the DC bus 2. The determination unit 12 performs the above-described determination using the measured values acquired by the acquisition unit 11.

The determination unit 13 is a function unit that determines whether or not the state of charge of the storage battery 71 has reached a predetermined state. The determination unit 13 determines, for example, whether or not the state of charge of the storage battery 71 has reached a fully charged state or a fully discharged state. The determination unit 13 performs the above-described determination using the measured values acquired by the acquisition unit 11.

The control unit 14 is a functional unit that performs cell balancing execution control for causing the BMU 72 to execute cell balancing. The control unit 14 performs the cell balancing execution control when the execution condition is satisfied and the state of charge of the storage battery 71 reaches the predetermined state.

Figure 4:
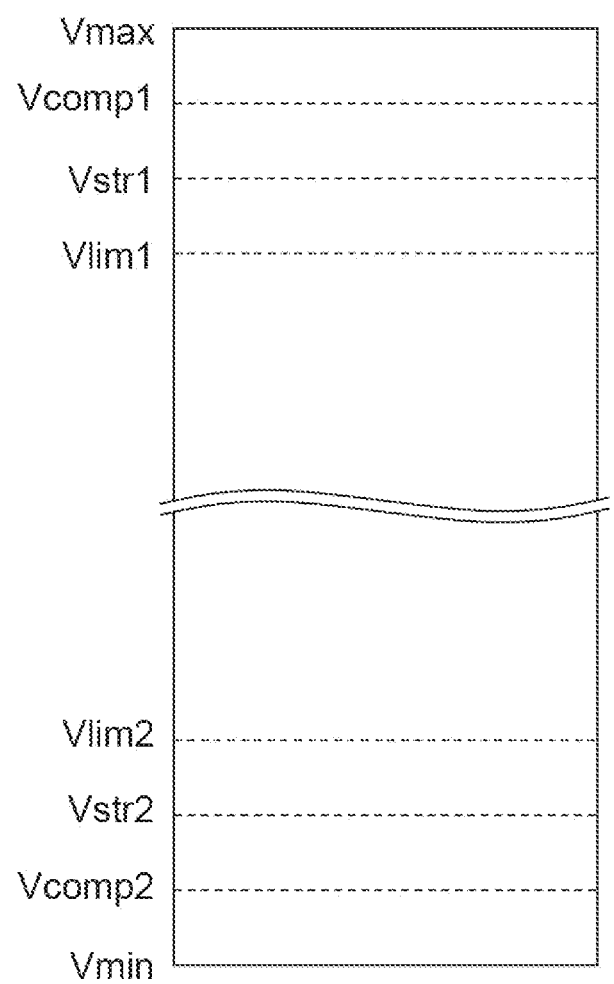
FIG. 4 is a diagram for explaining a relationship between a cell balancing function and a cell voltage of a battery cell.

Here, the relationship between the cell balancing function and the cell voltage of the battery cell will be described with reference to FIG. 4. As shown in FIG. 4, each battery cell can be used in a range of the cell voltage Vcell from a minimum voltage Vmin to a maximum voltage Vmax. The maximum voltage Vmax is a maximum voltage at which the battery cell can be charged. The minimum voltage Vmin is a minimum voltage at which the battery cell can be discharged. When the battery cell is charged at the cell voltage Vcell exceeding the maximum voltage Vmax, the battery cell is overcharged. When the battery cell is discharged until the cell voltage Vcell falls below the minimum voltage Vmin, the battery cell is over-discharged.

Therefore, in consideration of safety, each battery cell is used in a range of the cell voltage Vcell from a lower limit voltage Vlim2 to an upper limit voltage Vlim1 during normal operation. The lower limit voltage Vlim2 is higher than the minimum voltage Vmin. The lower limit voltage Vlim2 is also referred to as a full discharge voltage. The upper limit voltage Vlim1 is higher than the lower limit voltage Vlim2 and lower than the maximum voltage Vmax. The upper limit voltage Vlim1 is also referred to as a full charge voltage. The difference between the maximum voltage Vmax and the upper limit voltage Vlim1 and the difference between the lower limit voltage Vlim2 and the minimum voltage Vmin are set to about 5% of the maximum voltage Vmax, for example.

The storage battery 71 includes the plurality of battery cells, and the cell voltage Vcell may vary from battery cell to battery cell. Therefore, when the maximum cell voltage Vcellmax reaches the upper limit voltage Vlim1, the state of charge of the storage battery 71 is regarded as a fully charged state. When the minimum cell voltage Vcellmin reaches the lower limit voltage Vlim2, the state of charge of the storage battery 71 is regarded as a fully discharged state. As the storage battery 71 is used, variation between the cell voltages Vcell of the battery cells included in the storage battery 71 may increase. When the difference between the maximum cell voltage Vcellmax and the minimum cell voltage Vcellmin increases, the effective storage capacity of the storage battery 71 decreases.

When the maximum cell voltage Vcellmax reaches a starting voltage Vstr1, the BMU 72 that operates the cell balancing function in the charging end period of the storage battery 71 starts the cell balancing operation, and when the maximum cell voltage Vcellmax reaches a completion voltage Vcomp1, the BMU 72 ends the cell balancing operation. The starting voltage Vstr1 is higher than the upper limit voltage Vlim1 and lower than the maximum voltage Vmax. The completion voltage Vcomp1 is higher than the starting voltage Vstr1 and lower than the maximum voltage Vmax. As described later, in the power feeding system 1, the storage battery 71 is continuously charged while the cell balancing of the storage battery 71 is being executed. Therefore, while the cell balancing is executed, the cell voltages Vcell of the battery cells included in the storage battery 71 gradually increase and approach each other. The voltage value when the cell voltages Vcell become equal to each other is set to the completion voltage Vcomp1.

When the minimum cell voltage Vcellmin reaches a starting voltage Vstr2, the BMU 72 that operates the cell balancing function in the discharge end period of the storage battery 71 starts the cell balancing operation, and when the minimum cell voltage Vcellmin reaches a completion voltage Vcomp2, the BMU 72 ends the cell balancing operation. The starting voltage Vstr2 is higher than the minimum voltage Vmin and lower than the lower limit voltage Vlim2. The completion voltage Vcomp2 is higher than the minimum voltage Vmin and lower than the starting voltage Vstr2. As described later, in the power feeding system 1, the storage battery 71 is continuously discharged while the cell balancing of the storage battery 71 is being executed. Therefore, while the cell balancing is executed, the cell voltages Well of the battery cells included in the storage battery 71 gradually decrease and approach each other. The voltage value when the cell voltages Vcell become equal to each other is set to the completion voltage Vcomp2.

Figure 5:
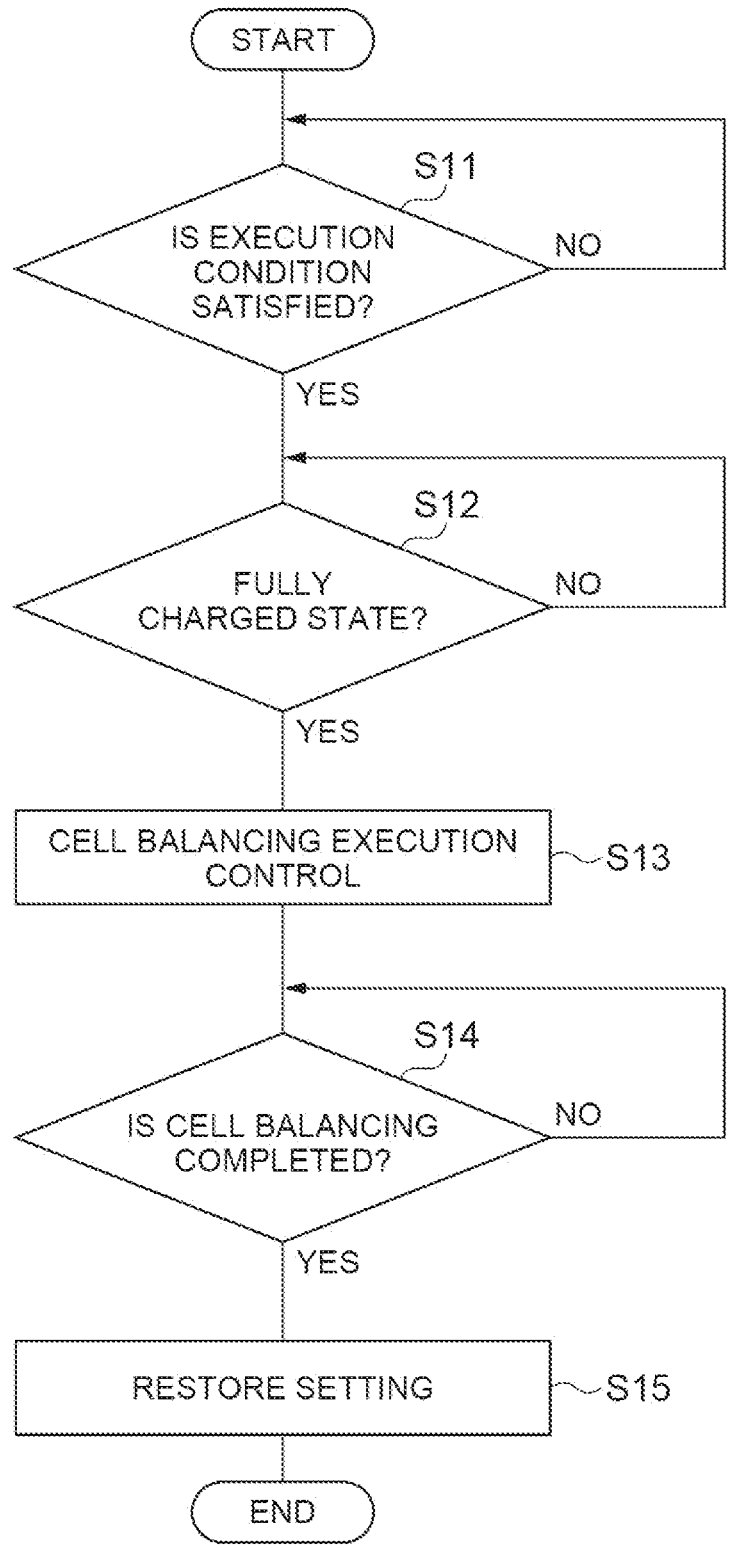
FIG. 5 is a flowchart showing a series of processes of a cell voltage equalization method performed by the power management device shown in FIG. 1.

Next, a cell voltage equalization method performed by the power management device 10 will be described with reference to FIG. 5. FIG. 5 is a flowchart showing a series of processes of a cell voltage equalization method performed by the power management device shown in FIG. 1. The cell voltage equalization method shown in FIG. 5 is performed for the BMU 72 that operates the cell balancing function in the charging end period of the storage battery 71. The series of processes shown in FIG. 5 is started by acquiring, for example, battery information of each storage battery 71, a measured value of the system power Ws, and a measured value of the load power WL. During the series of processes shown in FIG. 5, the acquisition unit 11 periodically acquires battery information of each storage battery 71, a measured value of the system power Ws, and a measured value of the load power WL.

First, the determination unit 12 determines whether or not the execution condition is satisfied (step S11). In step S11, the determination unit 12 performs first determination and second determination. Note that the first determination and the second determination are performed using the measured values acquired by the acquisition unit 11, but for convenience of description, the measured value of the cell voltage Vcell is simply expressed as "cell voltage Vcell". Other parameters are expressed in the same manner.

First Determination

The determination unit 12 calculates the rate Rd of each storage battery 71 and compares each rate Rd with a rate threshold value Rdth. As shown in Equation (1), the rate Rd is obtained by dividing the difference between the maximum cell voltage Vcellmax and the minimum cell voltage Vcellmin by a theoretical value Vcell_t of the cell voltage.

[Equation 1]

$$Rd = \frac{Vcell\max - Vcell\min}{Vcell\_t} \times 100 \qquad (1)$$

As the maximum cell voltage Vcellmax and the minimum cell voltage Vcellmin, a maximum cell voltage Vcell and a minimum cell voltage Vcell among a plurality of cell voltages measured (acquired) at the same time are used, respectively. The theoretical value Vcell_t is obtained, for example, by dividing the maximum voltage of the storage battery 71 by the number of battery cells in series. The maximum voltage of the storage battery 71 is a maximum voltage at which the storage battery 71 can be charged. The theoretical value is equal to, for example, the maximum voltage Vmax. The rate threshold value Rdth is set in advance. The rate threshold value Rdth is, for example, 2.0% or less. A method for determining the rate threshold value Rdth will be described later. When any rate Rd is greater than the rate threshold value Rdth, the determination unit 12 determines that the execution condition is satisfied for the storage battery 71 having the rate Rd (step S11; YES). Then, the determination unit 12 determines the storage battery 71 as a storage battery 71 to be subjected to cell balancing (hereinafter simply referred to as "target storage battery 71").

Second Determination

The determination unit 12 calculates the storage capacity rate Rc of the entire storage battery 71 and compares the storage capacity rate Rc with a capacity rate threshold value Rcth. As shown in Equation (2), the storage capacity rate Rc is obtained by dividing the moving average value of the value obtained by subtracting the total Ws_total per day of the system power Ws from the total WL_total per day of the load power WL (power consumption) by a theoretical value Cmod of the storage capacity of the entire storage battery 71.

[Equation 2]

$$Rc = \frac{SMA(WL\_total - Ws\_total)}{Cmod} \times 100 \qquad (2)$$

The function SMA is used to calculate a moving average value. Here, a moving average value for the last five days is calculated. The theoretical value Cmod is the sum of the rated capacities of all storage batteries 71 included in the power feeding system 1. The capacity rate threshold value Rcth is set in advance. The capacity rate threshold value Rcth is, for example, 65% or more. A method for determining the capacity rate threshold value Rcth will be described later. When the storage capacity rate Rc is less than the capacity rate threshold value Rcth, the determination unit 12 determines that the execution condition is satisfied (step S11; YES). Then, the determination unit 12 determines any storage battery 71 among all storage batteries 71 included in the power feeding system 1 as the target storage battery 71. For example, the determination unit 12 determines the target storage battery 71 from all storage batteries 71 in a predetermined order. After all the storage batteries 71 are selected as the target storage battery 71, the first storage battery 71 is selected again in the order.

That is, when the rate Rd of any one of the storage batteries 71 is greater than the rate threshold value Rdth or when the storage capacity rate Rc is less than the capacity rate threshold value Rcth, the determination unit 12 determines that the execution condition is satisfied (step S11; YES). On the other hand, when the rate Rd is less than the rate threshold value Rdth and the storage capacity rate Rc is greater than the capacity rate threshold value Rcth for any of the storage batteries 71, the determination unit 12 determines that the execution condition is not satisfied (step S11; NO).

When it is determined in step S11 that the execution condition is not satisfied (step S11; NO), the determination unit 12 repeats the determination in step S11 until the execution condition is satisfied. For example, each time the acquisition unit 11 acquires each measured value, the determination unit 12 repeats the determination in step S11 using the acquired measured values. On the other hand, when it is determined in step S11 that the execution condition is satisfied (step S11; YES), the determination unit 12 outputs a determination result indicating that the execution condition is satisfied to the determination unit 13 and the control unit 14. The determination result includes identification information for identifying the target storage battery 71.

Subsequently, when the determination unit 13 receives the determination result from the determination unit 12, the determination unit 13 determines whether or not the state of charge of the target storage battery 71 identified by the identification information is a fully charged state (step S12). In the present embodiment, the determination unit 13 determines whether or not time maximum cell voltage Vcellmax among the cell voltages Vcell of the battery cells included in the target storage battery 71 is equal to or greater than the upper limit voltage Vlim1.

When the maximum cell voltage Vcellmax is less than the upper limit voltage Vlim1, the determination unit 13 determines that the state of charge of the target storage battery 71 is not a fully charged state (step S12; NO), and repeats the determination in step S12 until the state of charge of the target storage battery 71 reaches a fully charged state. For example, each time the acquisition unit 11 acquires the measured values of the plurality of cell voltages Vcell included in the target storage battery 71, the determination unit 13 repeats the determination in step S12 using the acquired measured values. On the other hand, when the maximum cell voltage Vcellmax is equal to or greater than the upper limit voltage Vlim1, the determination unit 13 determines that the state of charge of the target storage battery 71 is a fully charged state (step S12; YES), and outputs a determination result indicating that the state of charge of the target storage battery 71 is a fully charged state to the control unit 14.

Subsequently, when the control unit 14 receives the determination result from the determination unit 12 and the determination result from the determination unit 13, the control unit 14 performs the cell balancing execution control (step S13). In the cell balancing execution control in step S13, the control unit 14 changes the target voltage of the bidirectional DC/DC converter 73 so that the state of charge of the target storage battery 71 becomes a state in which the BMU 72 starts cell balancing. In the present embodiment, the control unit 14 transmits a setting command of the target voltage to the bidirectional DC/DC converter 73 in order to lower the target voltage of the bidirectional DC/DC converter 73.

Further, in the cell balancing execution control in step S13, the control unit 14 transmits a setting command of the maximum current value to the bidirectional DC/DC converter 73 in order to lower the maximum current value of the electric current between the bidirectional DC/DC converter 73 and the target storage battery 71. Further, the control unit 14 transmits a stop command to the power conditioner 32 in order to stop the power supply of the renewable energy power generation device 31 and transmits a start command to the AC/DC converter 52 in order to cause the auxiliary power supply device 5 to supply electric power. When the auxiliary power supply device 5 has already been started up, the start command is not transmitted.

By the cell balancing execution control, the target storage battery 71 is charged more preferentially than any other storage battery 71 without stopping the power supply to the load device L. When the maximum cell voltage Vcellmax reaches the starting voltage Vstr1, the BMU 72 executes the cell balancing of the plurality of battery cells included in the target storage battery 71. At this time, since the target storage battery 71 is continuously charged, the cell voltages Vcell of the battery cells included in the target storage battery 71 gradually increases so as to be equal to each other.

Subsequently, the determination unit 13 determines whether or not the cell balancing of the target storage battery 71 has been completed (step S14). In the present embodiment, the determination unit 13 determines whether or not the maximum cell voltage Vcellmax among the cell voltages Vcell of the battery cells included in the target storage battery 71 is equal to or greater than the completion voltage Vcomp1. When the maximum cell voltage Vcellmax is less than the completion voltage Vcomp1, the determination unit 13 determines that the cell balancing of the target storage battery 71 has not been completed (step S14; NO), and repeats the determination in step S14 until the cell balancing of the target storage battery 71 is completed. For example, each time the acquisition unit 11 acquires measured values of the cell voltages Vcell included in the target storage battery 71, the determination unit 13 repeats the determination in step S14 using the acquired measured values. On the other hand, when the maximum cell voltage Vcellmax is equal to or greater than the completion voltage Vcomp1, the determination unit 13 determines that the cell balancing of the target storage battery 71 has been completed (step S14; YES), and outputs a determination result indicating that the cell balancing of the target storage battery 71 has been completed to the control unit 14.

Subsequently, when the control unit 14 receives the determination result from the determination unit 13, the control unit 14 restores the setting changed in the cell balancing execution control in step S13 to the original setting (step S15). Specifically, the control unit 14 transmits a setting command of the target voltage to the bidirectional DC/DC converter 73 in order to raise the target voltage of the bidirectional DC/DC converter 73 to the original target voltage. Further, the control unit 14 transmits a setting command of the maximum current value to the bidirectional DC/DC converter 73 in order to raise the maximum current value of the electric current between the bidirectional DC/DC converter 73 and the target storage battery 71 to the original maximum current value, Further, the control unit 14 transmits a start command to the power conditioner 32 in order to restart the power supply of the renewable energy power generation device 31, and transmits a stop command to the AC/DC converter 52 in order to stop the power supply of the auxiliary power supply device 5.

As described above, the series of processes of the cell voltage equalization method shown in FIG. 5 ends.

Figure 6:
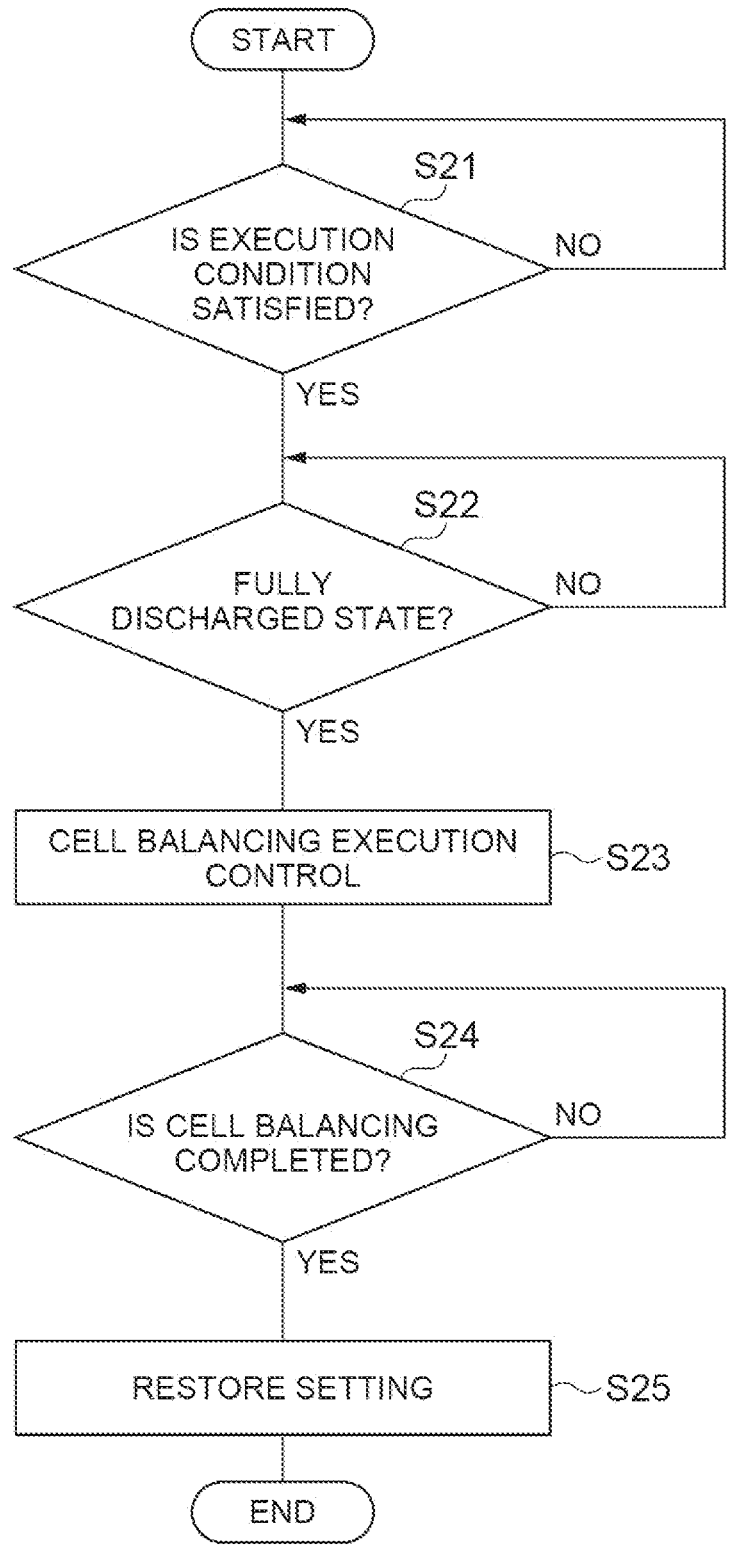
FIG. 6 is a flowchart showing a series of processes of another cell voltage equalization method performed by the power management device shown in FIG. 1.

Next, another cell voltage equalization method performed by the power management device 10 will be described with reference to FIG. 6. FIG. 6 is a flowchart showing a series of processes of another cell voltage equalization method performed by the power management device shown in FIG. 1. The cell voltage equalization method shown in FIG. 6 is performed for the 72 that operates the cell balancing function in the discharging end period of the storage battery 71. The series of processes shown in FIG. 6 is started by acquiring, for example, battery information of each storage battery 71, a measured value of the system power Ws, and a measured value of the load power WL. During the series of processes shown in FIG. 6, the acquisition unit 11 periodically acquires battery information of each storage battery 71, a measured value of the system power Ws, and a measured value of the load power WL.

First, the determination unit 12 determines whether or not the execution condition is satisfied (step S21). Since step S21 is the same as step S11, detailed description thereof will be omitted here.

Subsequently, when the determination unit 13 receives a determination result indicating that the execution condition is satisfied from the determination unit 12, the determination unit 13 determines whether or not the state of charge of the target storage battery 71 identified by the identification information is a fully discharged state (step S22). In the present embodiment, the determination unit 13 determines whether or not the minimum cell voltage Vcellmin among the cell voltages Vcell of the battery cells included in the target storage battery 71 is equal to or less than the lower limit voltage Vlim2.

When the minimum cell voltage Vcellmin is greater than the lower limit voltage Vlim2, the determination unit 13 determines that the state of charge of the target storage battery 71 is not a fully discharged state (step S22; NO), and repeats the determination in step S22 until the state of charge of the target storage battery 71 reaches a fully discharged state. For example, each time the acquisition unit 11 acquires the measured values of the plurality of cell voltages Vcell included in the target storage battery 71, the determination unit 13 repeats the determination in step S22 using the acquired measured values. On the other hand, when the minimum cell voltage Vcellmin is equal to or less than the lower limit voltage Vlim2, the determination unit 13 determines that the state of charge of the target storage battery 71 is a fully discharged state (step S22; YES), and outputs a determination result indicating that the state of charge of the target storage battery 71 is a fully discharged state to the control unit 14.

Subsequently, when the control unit 14 receives the determination result from the determination unit 12 and the determination result from the determination unit 13, the control unit 14 20 performs the cell balancing execution control (step S23). In the cell balancing execution control in step S23, the control unit 14 changes the target voltage of the bidirectional DC/DC converter 73 so that the state of charge of the target storage battery 71 becomes a state in which the BMU 72 starts cell balancing. In the present embodiment, the control unit 14 transmits a setting command of the target voltage to the bidirectional DC/DC converter 73 in order to raise the target voltage of the bidirectional DC/DC converter 73.

Further, in the cell balancing execution control in step S23, the control unit 14 transmits a setting command of the maximum current value to the bidirectional DC/DC converter 73 in order to lower the maximum current value of the electric current between the bidirectional DC/DC converter 73 and the target storage battery 71. Further, the control unit 14 transmits a stop command to the power conditioner 32 in order to stop the power supply of the renewable energy power generation device 31, and transmits a start command to the AC/DC converter 52 in order to cause the auxiliary power supply device 5 to supply electric power. When the auxiliary power supply device 5 has already been started up, the start command is not transmitted.

By the cell balancing execution control, the target storage battery 71 is discharged more preferentially than any other storage battery 71 without stopping the power supply to the load device L. When the minimum cell voltage Vcellmin reaches the starting voltage Vstr2, the BMU 72 executes the cell balancing of the plurality of battery cells included in the target storage battery 71. At this time, since the target storage battery 71 is continuously discharged, the cell voltages Vcell of the battery cells included in the target storage battery 71 gradually decreases so as to be equal to each other.

Subsequently, the determination unit 13 determines whether or not the cell balancing of the target storage battery 71 has been completed (step S24). In the present embodiment, the determination unit 13 determines whether or not the minimum cell voltage Vcellmin among the cell voltages Vcell of the battery cells included in the target storage battery 71 is equal to or less than the completion voltage Vcomp2. When the minimum cell voltage Vcellmin is greater than the completion voltage Vcomp2, the determination unit 13 determines that the cell balancing of the target storage battery 71 has not been completed (step S24; NO), and repeats the determination in step S24 until the cell balancing of the target storage battery 71 is completed. On the other hand, when the minimum cell voltage Vcellmin is equal to or less than the completion voltage Vcomp2, the determination unit 13 determines that the cell balancing of the target storage battery 71 has been completed (step S24; YES), and outputs a determination result indicating that the cell balancing of the target storage battery 71 has been completed to the control unit 14.

Subsequently, when the control unit 14 receives the determination result from the determination unit 13, the control unit 14 15 restores the setting changed in the cell balancing execution control in step S23 to the original setting (step S25). Specifically, the control unit 14 transmits a setting command of the target voltage to the bidirectional DC/DC converter 73 in order to lower the target voltage of the bidirectional DC/DC converter 73 to the original target voltage. Further, the control unit 14 transmits a setting command of the maximum current value to the bidirectional DC/DC converter 73 in order to raise the maximum current value of the electric current between the bidirectional DC/DC converter 73 and the target storage battery 71 to the original maximum current value. Further, the control unit 14 transmits a start command to the power conditioner 32 in order to restart the power supply of the renewable energy power generation device 31, and transmits a stop command to the AC/DC converter 52 in order to stop the power supply of the auxiliary power supply device 5.

As described above, the series of processes of the cell voltage equalization method shown in FIG. 6 ends.

Next, an example of a method for determining the rate threshold value Rdth will be described. First, ten each of the following four types of storage batteries 71 (battery modules) were prepared.

Battery Module 1

Battery Type: LFP (Olivine Iron Lithium-Ion Battery), Number of Battery Cells (in series): 16, Maximum Module Voltage (Maximum Voltage of Storage Battery 71): 57.6 V, Maximum Voltage of Battery Cell: 3.60 V Battery Module 2

Battery Type: LFP (Olivine Iron Lithium-ion Battery), Number of Battery Cells (in series): 16, Maximum Module Voltage: 56.0 V, Maximum Voltage of Battery Cell: 3.50 V Battery Module 3

Battery Type: NMC (Ternary Lithium-Ion Battery (Nickel, Manganese, Cobalt)), Number of Battery Cells (in series): 14, Maximum Module Voltage: 58.1 V, Maximum Voltage of Battery Cell: 4.15 V Battery Module 4

Battery Type: LIM (Lithium Titanate+Spinel Manganese Lithium-Ion Battery), Number of Battery Cells (in series): 28, Maximum Module Voltage: 58.8 V, Maximum Voltage of Battery Cell: 2.10 V The rate threshold value Rdth was set to several values, and the power feeding system 1 was operated at each rate threshold value Rdth by using ten battery modules of each type. As a result, the frequency (number) and the cumulative total of the battery modules that do not satisfy the requirement for the function and the operation frequency of the cell balancing function were determined. The results are shown in Table 1. When the battery module was repeatedly charged and discharged without operating the cell balancing function, the battery module that could not be charged and discharged was determined to be a battery module that did not satisfy the requirement for the function. The power feeding system 1 was operated in ascending order of the rate threshold value, and the number of battery modules that did not satisfy the requirement for the function at the rate threshold value was used as the frequency. The cumulative total is the sum of frequencies at rate threshold values less than or equal to the rate threshold value.

The operation frequency is a ratio of the number of times the cell balancing function is operated to the number of times the state of charge of the storage battery 71 reaches a predetermined state (fully, charged state or fully discharged state). When the BMU 72 that operates the cell balancing function in the charging end period of the storage battery 71 is used, the operation frequency is a ratio of the number of times the cell balancing function is operated to the number of times the state of charge of the storage battery 71 reaches the fully, charged state. When the BMU 72 that operates the cell balancing function in the discharge end period of the storage battery 71 is used, the operation frequency is a ratio of the number of times the cell balancing function is operated to the number of times the state of charge of the storage battery 71 reaches the fully discharged state.

TABLE 1

| RATE THRESHOLD VALUE [%] | BATTERY MODULE 1 | | | BATTERY MODULE 2 | | |
|---|---|---|---|---|---|---|
| | NUMBER OF DEFECTIVES | | OPERATION FREQUENCY [%] | NUMBER OF DEFECTIVES | | OPERATION FREQUENCY [%] |
| | FREQUENCY | CUMULATIVE TOTAL | | FREQUENCY | CUMULATIVE TOTAL | |
| 0.1 | 0 | 0 | 100.0 | 0 | 0 | 100.0 |
| 0.2 | 0 | 0 | 95.2 | 0 | 0 | 94.9 |
| 0.3 | 0 | 0 | 20.0 | 0 | 0 | 19.5 |
| 0.5 | 0 | 0 | 10.0 | 0 | 0 | 9.7 |
| 1.0 | 0 | 0 | 3.5 | 0 | 0 | 3.3 |
| 1.5 | 0 | 0 | 1.6 | 0 | 0 | 1.6 |
| 2.0 | 0 | 0 | 1.0 | 0 | 0 | 0.9 |
| 2.5 | 2 | 2 | 0.8 | 1 | 1 | 0.6 |
| 3.0 | 3 | 5 | 0.5 | 1 | 2 | 0.4 |
| 3.5 | 5 | 10 | 0.1 | 3 | 5 | 0.2 |
| 4.0 | — | — | 0.0 | 5 | 10 | 0.0 |

| RATE THRESHOLD VALUE [%] | BATTERY MODULE 3 | | | BATTERY MODULE 4 | | |
|---|---|---|---|---|---|---|
| | NUMBER OF DEFECTIVES | | OPERATION FREQUENCY [%] | NUMBER OF DEFECTIVES | | OPERATION FREQUENCY [%] |
| | FREQUENCY | CUMULATIVE TOTAL | | FREQUENCY | CUMULATIVE TOTAL | |
| 0.1 | 0 | 0 | 99.3 | 0 | 0 | 100.0 |
| 0.2 | 0 | 0 | 93.0 | 0 | 0 | 95.3 |
| 0.3 | 0 | 0 | 17.5 | 0 | 0 | 21.0 |
| 0.5 | 0 | 0 | 8.3 | 0 | 0 | 10.6 |
| 1.0 | 0 | 0 | 2.9 | 0 | 0 | 3.8 |
| 1.5 | 0 | 0 | 1.1 | 0 | 0 | 1.7 |
| 2.0 | 0 | 0 | 1.0 | 0 | 0 | 1.2 |
| 2.5 | 1 | 1 | 0.7 | 2 | 2 | 0.9 |
| 3.0 | 3 | 4 | 0.4 | 5 | 7 | 0.6 |

TABLE 1-continued

| 3.5 | 5 | 9  | 0.1 | 3 | 10 | 0.3 |
|-----|---|----|-----|---|----|-----|
| 4.0 | 1 | 10 | 0.0 | — | —  | 0.0 |

According to the results shown in Table 1, it was confirmed that the power feeding system 1 is not stopped when the rate threshold value Rdth is 2.0% or less. The power supply of the renewable energy power generation device 31 is stopped in the cell balancing execution control. Therefore, when the operation frequency of the cell balancing function is high (for example, the operation frequency is greater than 30%), the effective use of the renewable energy by the renewable energy power generation device 31 is inhibited. Therefore, it was confirmed that when the rate threshold value Rdth is 0.3% or more, renewable energy is effectively utilized. When the rate threshold value Rdth is 0.1%, the difference between the maximum cell voltage Vcellmax and the minimum cell voltage Vcellmin is about 5 mV. When the rate threshold value Rdth is 0.2%, the difference between the maximum cell voltage Vcellmax and the minimum cell voltage Vcellmin is about 8 mV. These differences are within an acceptable range.

Next, an example of a method for determining the capacity rate threshold value Rcth will be described. The capacity rate threshold value Rcth was set to several values, and the power feeding system 1 was operated at each capacity rate threshold value Rcth by using the battery modules 1 described above. As a result, the frequency (number) and the cumulative total of the battery modules that do not satisfy the requirement for the function and the operation frequency of the cell balancing function were determined. The results are shown in Table 2. The power feeding system 1 was operated in descending order of the capacity rate threshold value, and the number of battery modules that did not satisfy the requirement for the function at the capacity rate threshold value was used as the frequency. The cumulative total is the sum of frequencies at capacity rate threshold values greater than or equal to the capacity rate threshold value

TABLE 2

| CAPACITY RATE THRESHOLD VALUE [%] | NUMBER OF DEFECTIVES FREQUENCY | NUMBER OF DEFECTIVES CUMULATIVE TOTAL | OPERATION FREQUENCY [%] |
|---|---|---|---|
| 97.0 | 0 | 0 | 98.5 |
| 95.0 | 0 | 0 | 93.0 |
| 90.0 | 0 | 0 | 25.0 |
| 80.0 | 0 | 0 | 7.0 |
| 75.0 | 0 | 0 | 3.8 |
| 70.0 | 0 | 0 | 2.9 |
| 65.0 | 0 | 0 | 2.5 |
| 60.0 | 1 | 1 | 2.3 |
| 55.0 | 1 | 2 | 2.4 |
| 50.0 | 3 | 5 | 2.5 |
| 45.0 | 5 | 10 | 2.3 |

According to the results shown in Table 2, it was confirmed that the power feeding system 1 is not stopped when the capacity rate threshold value Rcth is 65% or more. As described above, when the operation frequency of the cell balancing function is high (for example, the operation frequency is greater than 30%), the effective use of the renewable energy by the renewable energy power generation device 31 is inhibited. Therefore, it was confirmed that when the capacity rate threshold value Rcth is 90% or less, renewable energy is effectively utilized In the power management device 10 and the power feeding system 1 described above, the target voltage of the bidirectional DC/DC converter 73 is changed so that the state of charge of the target storage battery 71 becomes a state in which the BMU 72 starts the cell balancing when the execution condition for executing the cell balancing is satisfied. The target storage battery 71 connected to the bidirectional DC/DC converter 73 is likely to be charged or discharged by changing the target voltage of the bidirectional DC/DC converter 73. Therefore, the cell balancing can be executed even if the storage battery 71 is used in a range in which the storage battery 71 is not in the charging end period or in the discharging end period during normal operation. As a result, it is possible to suppress a decrease in the effective storage capacity of the storage battery 71.

The control unit 14 performs the cell balancing execution control when the execution condition is satisfied and the state of charge of the target storage battery 71 reaches the predetermined state. At the time when the execution condition is satisfied, the state of charge of the target storage battery 71 is not necessarily a fully charged state or a fully discharged state. According to the above-described configuration, for example, when the BMU 72 that executes cell balancing when the storage battery 71 is in the charging end period is used, the cell balancing execution control is performed in response to the state of charge of the target storage battery 71 reaching the upper limit (fully charged state) of the normal use range. In other words, the power feeding system 1 is normally operated until the state of charge of the target storage battery 71 reaches the fully charged state. Similarly, for example, when the BMU 72 that executes cell balancing when the storage battery 71 is in the discharge end period is used, the cell balancing execution control is performed in response to the state of charge of the target storage battery 71 reaching the lower limit (fully discharged state) of the normal use range. In other words, the power feeding system 1 is normally operated until the state of charge of the target storage battery 71 reaches the fully discharged state. Therefore, since the power feeding system 1 can be normally operated as much as possible, the stability of the power feeding system 1 can be improved.

The BMU 72 may execute cell balancing when the storage battery 71 reaches the charging end period. In this case, the control unit 14 performs the cell balancing execution control when the execution condition is satisfied and the state of charge of the target storage battery 71 reaches a fully charged state. The control unit 14 lowers the target voltage of the bidirectional DC/DC converter 73 in the cell balancing execution control. According to this configuration, by lowering the target voltage of the bidirectional DC/DC converter 73, the target storage battery 71 is further charged from the fully charged state. As a result, the state of charge of the target storage battery 71 can be set to a state of charge in which the BMU 72 starts the cell balancing, so that a decrease in the effective storage capacity of the target storage battery 71 can be suppressed.

The BMU 72 may execute cell balancing when the storage battery 71 reaches the discharging end period. In this case, the control unit 14 performs the cell balancing execution control when the execution condition is satisfied and the state of charge of the target storage battery 71 reaches a fully discharged state. The control unit 14 raises the target voltage of the bidirectional DC/DC converter 73 in the cell balancing execution control. According to this configuration, by raising the target voltage of the bidirectional DC/DC converter 73, the target storage battery 71 is further discharged from the fully discharged state. As a result, the state of charge of the target storage battery 71 can be set to a state of charge in which the 72 starts the cell balancing, so that a decrease in the effective storage capacity of the target storage battery 71 can be suppressed.

In the cell balancing execution control, the control unit 14 lowers the maximum current value of the electric current between the bidirectional DC/DC converter 73 and the target storage battery 71. The cell balancing is executed when the state of charge of the storage battery 71 is the charging end period or the discharging end period. If the storage battery 71 in the charging end period is rapidly charged, the storage battery 71 may be overcharged. Therefore, by lowering the maximum current value, the charging speed can be reduced, and the possibility that the target storage battery 71 is overcharged can be reduced. Similarly, if the storage battery 71 in the discharge end period is rapidly discharged, the storage battery 71 may be over-discharged. Therefore, by lowering the maximum current value, the discharging speed can be reduced and the possibility that the target storage battery 71 is over-discharged can be reduced.

When the maximum current value of the electric current between the bidirectional DC/DC converter 73 and the target storage battery 71 is lowered, the amount of electric power that can be charged to the target storage battery 71 via the bidirectional DC/DC converter 73 is reduced. Therefore, when the renewable energy power generation device 31 generates the generated power Wre, the amount of the electric power received by the target storage battery 71 decreases, so that the electric power balance may be lost. For this problem, the control unit 14 stops the power supply of the renewable energy power generation device 31 in the cell balancing execution control. According to this configuration, the electric power balance can be maintained.

The control unit 14 causes the auxiliary power supply device 5 to supply the system power Ws in the cell balancing execution control. The power Wc that can be supplied from the target storage battery 71 may decrease due to executing the cell balancing. For example, if the maximum current value of the electric current between the bidirectional DC/DC converter 73 and the target storage battery 71 is lowered, the power Wc that can be supplied from the target storage battery 71 may decrease. Therefore, by causing the auxiliary power supply device 5 to supply the system power Ws, it is possible to compensate for the decrease in the power Wc supplied from the target storage battery 71.

The determination unit 12 determines whether or not the execution condition is satisfied based on the maximum cell voltage Vcellmax and the minimum cell voltage Vcellmin among the cell voltages Vcell of the plurality of battery cells. It is considered that the greater the difference between the maximum cell voltage Vcellmax and the minimum cell voltage Vcellmin is, the greater the variation in the state of charge among the plurality of battery cells is. Therefore, by considering the maximum cell voltage Vcellmax and the minimum cell voltage Vcellmin, it is possible to improve the accuracy of determining whether or not the cell balancing should be executed.

Specifically, when the rate Rd is greater than the rate threshold value Rdth, the determination unit 12 determines that the execution condition is satisfied. The rate Rd is obtained by dividing the difference between the maximum cell voltage Vcellmax and the minimum cell voltage Vcellmin by the theoretical value Vcell_t of the cell voltage. The magnitude of the difference between the maximum cell voltage Vcellmax and the minimum cell voltage Vcellmin, which can be determined as the occurrence of the variation in the state of charge among the plurality of battery cells, varies depending on the theoretical value Vcell_t of the cell voltage. For example, as the theoretical value Vcell_t of the cell voltage is larger, the magnitude of the difference that can be determined as the occurrence of the variation becomes larger. Therefore, by using the rate Rd, it is possible to further improve the accuracy of determining whether or not the cell balancing should be executed.

The rate threshold value Rdth is set to 0.3% or more and 2.0% or less. When the rate threshold value Rdth is 0.3% or more, the renewable energy can be effectively utilized. When the rate threshold value Rdth is 2.0% or less, the possibility that the function of the battery cell is impaired can be reduced. As a result, the cell balancing can be executed while effectively utilizing the renewable energy without impairing the functions of any of the battery cells. This makes it possible to further suppress a decrease in the effective storage capacity of the storage battery 71.

The determination unit 12 determines whether or not the execution condition is satisfied based on the total WL_total of the load power WL per day consumed by all the load devices L and the total Ws_total of the system power Ws per day supplied from the auxiliary power supply device 5 to the DC bus 2. When the power Wc that can be supplied from the storage battery 71 is less than the load power WL, the system power Ws is supplied from the auxiliary power supply device 5. Therefore, a value obtained by subtracting the total Ws_total from the total WL_total can be estimated as the effective storage capacity of the storage battery 71. It is considered that the smaller the effective storage capacity is, the greater the variation in the state of charge among the plurality of battery cells is. Therefore, by considering the total WL_total and the total Ws_total, it is possible to improve the accuracy of determining whether or not the cell balancing should be executed.

Specifically, when the storage capacity rate Rc is less than the capacity rate threshold value Rcth, the determination unit 12 determines that the execution condition is satisfied. The storage capacity rate Rc is obtained by dividing a moving average value of a value obtained by subtracting the total Ws_total of the power Wc per day from the total WL_total of the load power WL (power consumption) per day by the theoretical value Cmod. Since the power consumption and the like can vary from day to day, the influence of the variation can be reduced by using the moving average value of values obtained by subtracting the total Ws_total from the total WL_total. Further, the size of the effective storage capacity which can be determined as the occurrence of the variation in the state of charge among the plurality of battery cells varies depending on the theoretical value Cmod. For example, as the theoretical value Cmod is larger, the size of the effective storage capacity that can be determined as the occurrence of the variation becomes larger. Therefore, by using the storage capacity rate Rc, it is possible to further improve the accuracy of determining whether or not the cell balancing should be executed.

The capacity rate threshold value Rcth is set to 65% or more and 90% or less. When the capacity rate threshold value Rcth is 65% or more, the possibility that the function of the battery cell is impaired can be reduced, When the capacity rate threshold value Rcth is 90% or less, the renewable energy can be effectively utilized. As a result, the cell balancing can be executed while effectively utilizing the renewable energy without impairing the functions of any of the battery cells. This makes it possible to further suppress a decrease in the effective storage capacity of the storage battery 71.

The power management device and the power feeding system according to the present disclosure are not limited to the above-described embodiments.

The power management device 10 may be configured by a single device coupled physically or logically, or may be configured by two or more devices that are physically or logically separated from each other. For example, the power management device 10 may be implemented by a plurality of computers distributed on a network, such as cloud computing.

At least one of the power conditioners 32, the AC/DC converter 52, the converters 6, and the bidirectional DC/DC converters 73 need not have the power measurement function. In this case, the power management device 10 may acquire the measured value of each electric power from the measured value of the voltage measured by the voltage sensor and the measured value of the electric current measured by the current sensor.

The power supply device 3 may include another power generation device in place of the renewable energy power generation device 31.

The auxiliary power supply device 5 may include a power generation device in place of the commercial power supply 51. An example of the power generation device is a diesel generator. In this case, the number of the auxiliary power supply devices 5 is not limited to one, and may be appropriately changed as necessary. When the auxiliary power supply device 5 does not include the commercial power supply 51, the power feeding system 1 is also referred to as an independent DC power feeding system.

In the above-described embodiment, each of the power conditioners 32, the AC/DC converter 52, the converters 6, and the bidirectional DC/DC converters 73 operates with a DC voltage generated inside the device. Alternatively, the power feeding system 1 may include a power supply unit, which generates a DC voltage having a constant voltage value from the bus voltage Vbus of the DC bus 2 or the commercial power supply 51, and supplies the DC voltage (electric power) to each device.

In the above embodiment, the determination unit 12 determines that the execution condition is satisfied when the rate Rd of any one of the storage batteries 71 is greater than the rate threshold value Rdth or when the storage capacity rate Rc is less than the capacity rate threshold value Rcth, but the method of determining whether or not the execution condition is satisfied is not limited to this. For example, when the rate Rd of any one of the storage batteries 71 is greater than the rate threshold value Rdth and the storage capacity rate Rc is less than the capacity rate threshold value Rcth, the determination unit 12 may determine that the execution condition is satisfied. The determination unit 12 may determine whether or not the execution condition is satisfied by using only one of the first determination and the second determination. The determination unit 12 may determine whether or not the execution condition is satisfied by using a determination other than the first determination and the second determination.

In the cell voltage equalization method shown in FIG. 5, step S12 may be omitted. In this case, the control unit 14 performs the cell balancing execution control in step S13 in response to receiving the determination result indicating that the execution condition is satisfied from the determination unit 12. At the time when the execution condition is satisfied, the state of charge of the target storage battery 71 is not necessarily a fully charged state. Therefore, since it is not necessary to wait until the state of charge of the target storage battery 71 reaches the fully charged state, the cell balancing can be performed on the target storage battery 71 early. Therefore, the decrease in the effective storage capacity of the storage battery 71 can be eliminated early.

Similarly, in the cell voltage equalization method shown in FIG. 6, step S22 may be omitted. In this case, the control unit 14 performs the cell balancing execution control in step S23 in response to receiving the determination result indicating that the execution condition is satisfied from the determination unit 12. At the time when the execution condition is satisfied, the state of charge of the target storage battery 71 is not necessarily a fully discharged state. Therefore, since it is not necessary to wait until the state of charge of the target storage battery 71 reaches the fully discharged state, the cell balancing can be performed on the target storage battery 71 early. Therefore, the decrease in the effective storage capacity of the storage battery 71 can be eliminated early.

In the cell balancing execution control, the control unit 14 need not lower the maximum current value of the electric current between the bidirectional DC/DC converter 73 and the target storage battery 71. In this case, the control unit 14 may continue the power supply of the renewable energy power generation device 31 without stopping the power supply, in the cell balancing execution control. In other words, the control unit 14 need not transmit any setting command of the maximum current value to the bidirectional DC/DC converter 73, and need not transmit any stop command to the power conditioner 32. According to this configuration, the renewable energy can be more effectively utilized.

If power Wc can be sufficiently supplied by the storage batteries 71 other than the target storage battery 71, the control unit 14 need not cause the auxiliary power supply device 5 to supply the system power Ws in the cell balancing execution control. In other words, the control unit 14 need not transmit a start command to the AC/DC converter 52.

REFERENCE SIGNS LIST

1 Power feeding system
2 DC bus
3 Power supply device
5 Auxiliary power supply device
6 Converter (first converter)
10 Power management device
12 Determination unit (first determination unit)
13 Determination unit (second determination unit)
14 Control unit
31 Renewable energy power generation device (power generation device)
71 Storage battery
72 BMU (battery management unit)
73 Bidirectional DC/DC converter (converter, second converter)
L Load device
Vbat Battery voltage
Vbus Bus voltage
VL Load voltage
Wre Generated power
Ws System power (supply power)
WL Load power (power consumption).

The invention claimed is:

1. A power management device comprising:
a first determination unit configured to determine whether or not an execution condition for executing cell balancing for equalizing states of charge of a plurality of battery cells included in a storage battery connected to a direct current (DC) bus via a converter is satisfied; and
a control unit configured to perform cell balancing execution control for causing a battery management device managing the storage battery to execute the cell balancing when the execution condition is satisfied,
wherein the control unit changes a target voltage of the converter so that a state of charge of the storage battery becomes a state in which the battery management device starts the cell balancing in the cell balancing execution control,
the first determination unit determines whether or not the execution condition is satisfied based on a total of power consumption per day consumed by load devices that receive electric power from the DC bus and a total of supply power per day supplied to the DC bus by an auxiliary power supply device that supplies electric power to the DC bus, and
the first determination unit determines that the execution condition is satisfied when a storage capacity rate obtained by dividing a moving average value of a value obtained by subtracting the total of the supply power from the total of the power consumption by a theoretical value of a storage capacity of the storage battery is less than a capacity rate threshold value set in advance.

2. The power management device according to claim 1, wherein the control unit lowers a maximum current value of an electric current between the converter and the storage battery in the cell balancing execution control.

3. The power management device according to claim 2, wherein the control unit stops power supply of a power generation device that supplies electric power to the DC bus in the cell balancing execution control.

4. The power management device according to claim 1, wherein the control unit causes an auxiliary power supply device that supplies electric power to the DC bus to supply electric power in the cell balancing execution control.

5. The power management device according to claim 1, further comprising a second determination unit configured to determine whether or not the state of charge of the storage battery becomes a predetermined state,
wherein the control unit performs the cell balancing execution control when the execution condition is satisfied and the state of charge becomes the predetermined state.

6. The power management device according to claim 5, wherein the second determination unit determines whether or not the state of charge of the storage battery becomes a fully charged state, and
wherein the control unit lowers the target voltage in the cell balancing execution control.

7. The power management device according to claim 5, wherein the second determination unit determines whether or not the state of charge of the storage battery becomes a fully discharged state, and wherein the control unit raises the target voltage in the cell balancing execution control.

8. The power management device according to claim 1, wherein the first determination unit determines whether or not the execution condition is satisfied based on a maximum cell voltage and a minimum cell voltage among cell voltages of the plurality of battery cells.

9. The power management device according to claim 8, wherein the first determination unit determines that the execution condition is satisfied when a rate obtained by dividing a difference between the maximum cell voltage and the minimum cell voltage by a theoretical value of the cell voltage is greater than a rate threshold value set in advance.

10. The power management device according to claim 9, wherein the rate threshold value is 0.3% or more and 2.0% or less.

11. The power management device according to claim 1, wherein the capacity rate threshold value is 65% or more and 90% or less.

12. A power feeding system comprising:
a DC bus for supplying DC electric power;
a power supply device including a power generation device, the power supply device being configured to supply electric power to the DC bus;
an auxiliary power supply device configured to supply electric power to the DC bus;
a first converter connected to the DC bus, the first converter being configured to convert a bus voltage supplied to the DC bus into a load voltage supplied to a load device;
a storage battery including a plurality of battery cells;
a battery management device configured to manage the storage battery;
a second converter provided between the storage battery and the DC bus, the second converter being capable of bidirectionally converting between the bus voltage and a battery voltage of the storage battery; and
a power management device configured to control the second converter to charge and discharge the storage battery,
wherein the power management device determines whether or not an execution condition for executing cell balancing for equalizing states of charge of the plurality of battery cells is satisfied,
the power management device changes a target voltage of the second converter so that a state of charge of the storage battery becomes a state in which the battery management device starts the cell balancing when the execution condition is satisfied,
wherein the power management device determines whether or not the execution condition is satisfied based on a total of power consumption per day consumed by load devices that receive electric power from the DC bus and a total of supply power per day supplied to the DC bus by an auxiliary power supply device that supplies electric power to the DC bus, and
the power management device determines that the execution condition is satisfied when a storage capacity rate obtained by dividing a moving average value of a value obtained by subtracting the total of the supply power from the total of the power consumption by a theoretical value of a storage capacity of the storage battery is less than a capacity rate threshold value set in advance.

* * * * *